United States Patent [19]

Schröder et al.

[11] Patent Number: 4,809,463

[45] Date of Patent: Mar. 7, 1989

[54] WINDOW FRAME WITH REINFORCED SEALING STRIPS

[75] Inventors: Franz Schröder, Hückswagen; Ludger Buller; Ludger Hemmis, both of Wuppertal, all of Fed. Rep. of Germany

[73] Assignee: Gebr. Happich GmbH, Fed. Rep. of Germany

[21] Appl. No.: 166,704

[22] Filed: Mar. 11, 1988

[30] Foreign Application Priority Data

Mar. 19, 1987 [DE] Fed. Rep. of Germany ....... 3708888

[51] Int. Cl.⁴ .................................................. E06B 7/16
[52] U.S. Cl. ......................................... 49/377; 49/441; 49/491; 49/502
[58] Field of Search ................. 49/374, 376, 377, 502, 49/441, 488, 491

[56] References Cited

U.S. PATENT DOCUMENTS

| 3,401,075 | 9/1968 | Jackson | 49/441 X |
| 3,479,768 | 11/1969 | Smadja | 49/441 |
| 4,308,305 | 12/1981 | Albrecht | 49/441 X |
| 4,442,634 | 4/1984 | Kimura | 49/377 X |
| 4,470,223 | 9/1984 | Mesnel | 49/441 |

Primary Examiner—Philip C. Kannan
Attorney, Agent, or Firm—Ostrolenk, Faber, Gerb & Soffen

[57] ABSTRACT

A window frame of rubber, or the like covering material, has two U-shaped sealing strips at opposite surfaces of the window. A respective U-shaped cross-section reinforcing strip insert is embedded in each of the sealing strips. A bridge joins the legs of the two sealing strips near the window. The sealing strips and the bridge include projecting fingers which engage the window surface. The bridge is removed from the bottom of the window cutout, and the bridge instead hangs down to define guides for the sides of the window as it moves down. Each reinforcing insert is a high tensile and compressive strength metal strip, but is also flexurally elastic and is smooth on the outside and is developed approximately U-shaped in cross-section. The window frame has ends which are butted and butt vulcanized, with the butt vulcanization place being free of the reinforcement insert.

20 Claims, 2 Drawing Sheets

WINDOW FRAME WITH REINFORCED SEALING STRIPS

BACKGROUND OF THE INVENTION

The present invention relates to a window frame for movable, i.e. lowerable, windows in automotive vehicles, which surrounds a window cutout. The frame is of rubber, or the like. The frame has two sealing strips of approximately U-shaped cross-section which in their mounted condition receive the window between them. The strips can be mounted on a body flange of the vehicle. The sealing strips are connected to each other as a single piece in the region of the upper edge of the window cutout and in the regions of the two side edges of the window cutout by a connecting bridge which extends approximately perpendicular to the plane of the window.

A window frame of this type is known from Federal Republic of Germany Published Application No. 3,226,106. In that known window frame, the sealing strips are not reinforced, i.e. they do not have embedded reinforcing inserts. As a result, it is difficult to anchor them into the window cutout. Anchoring requires providing anchoring elements such as spring clamps, or the like.

SUMMARY OF THE INVENTION

The object of the present invention is to provide a window frame of the above type which is reinforced in the region of the sealing strips and can be mounted simply, in particular without additional anchoring elements, and which is capable of compensating for manufacturing tolerances and of satisfying technical and aesthetic requirements.

According to the invention, each of the two sealing strips of the window frame is on one of the two side surfaces of the window. Each sealing strip comprises an extruded profile which has a reinforcing insert extending through it. Each reinforcing insert is of high tensile and compressive strength but is flexible or flexurally elastic. It is smooth on the outside. It is approximately U-shaped in cross section. The ends of the extruded sealing strips and the connecting bridge are brought together to form a closed frame through a butt vulcanized place provided on their opposite previously unconnected ends. The butt vulcanized place at both ends is free of the reinforcing insert. The connecting bridge is separated from the sealing strips in the region of the lower edge of the window cutout so that the sealing strips still engage the sides of the window, but the bridge does not interfere with the window which would move through the location of the bridge between the sealing strips, e.g. upon lowering the window.

The window frame of the invention offers a number of advantages. First, the reinforcing insert, which is embedded in each sealing strip, enables easy mounting and a reliable holding of the window frame on the body flanges around the window cutout. The reinforcing insert is smooth. This has the advantage that the surface of the window frame is also smooth without places of indentation, markings, or the like, and this satisfies aesthetic requirements. Formation of a closed frame does away with problems of sealing. The butt vulcanization place compensates for tolerances since there is intentionally no reinforcement insert present in the region of the place of vulcanization.

In one embodiment of the invention, the part of the connecting bridge which is separated from the sealing strips would have been at the bottom edge of the window cutout, if the bridge were at that edge. The separated bridge there is cut through, for instance, at the center of the length of that portion. The resulting end regions of the connecting bridge form additional window guides extending in the downward directed extension of the two side edges of the window cutout. The part of the bridge that is cut from the sealing strips therefore is not scrap but instead is an advantageous functional part of the window frame of the invention. In a further development, the sealing strips and the connecting bridge are developed with sealing lips which rest against the window.

In another development of the invention, the connecting bridge has an approximately U-shaped cross-section. Via the ends of the arms of that U, the bridge is connected with the sealing strips, in each case by a relatively thin continuous connecting web. After incision of the connecting webs, they can be used, in practice, as a tear line for separating the corresponding connecting bridge part. Undesired further tearing can be prevented by preproduced punched holes, or the like.

Compensation for even larger manufacturing tolerances can be obtained with a relatively long, for instance up to 30 mm, place of vulcanization free of the reinforcement insert which is provided between the butt ends of the sealing strips and the connecting bridge, since the window frame is capable of being compressed and stretched in the region of the vulcanization place. The vulcanization place is located preferably in a lower corner region of the window holding frame, and is thereby substantially concealed, particularly if a triangular mirror of a rear-view outside mirror is located in that corner region.

In a particularly advantageous development of the invention, each reinforcing insert is formed by a metal strip of a U-shaped profile which comprises at least one continuous web with a plurality of rungs arranged, without spacing between the rungs, alongside each other and oriented transversely to the longitudinal axis of the strip. Arranging the rungs without spacing alongside of each other avoids places of indentation in the window frame. Each reinforcing insert preferably has a web in the base leg of the U-shaped profiled metal strip and the rungs are arranged without spacing alongside of each other on both lateral sides of the web. In this case, each reinforcing insert is comprised of a stamp cut, rolled smooth and U-profiled strip of metal. It is coated with a coupling agent on both its sides for dependable anchoring in the covering of rubber material, or the like.

One embodiment of the invention is explained in further detail below with reference to the accompanying drawings.

DESCRIPTION OF A PREFERRED EMBODIMENT

Figure 1:
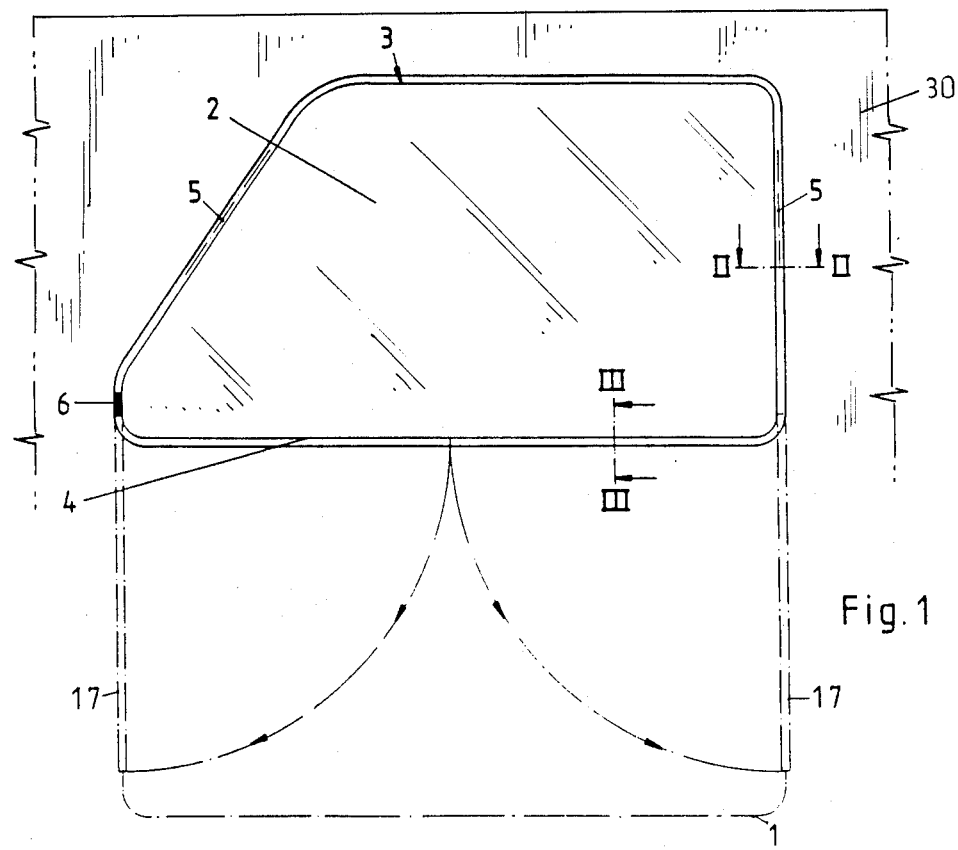
FIG. 1 schematically shows a window frame surrounding a window cutout in the door frame of an automotive vehicle.

FIG. 1 shows a door frame 1 of an automotive vehicle 30 which has a window frame of the vehicle disposed in and surrounding a window cutout 2. The window cutout 2 is defined by an upper edge 3, a lower edge 4 and two side edges 5. The window frame is developed as a closed frame and has a butt vulcanized place 6 at which the ends of the elongate strip-like window frame are secured to complete the frame. In the region of the upper edge 3 and of the side edges 5 of the window cutout, the window frame is developed as a window-guide profile, shown in further detail in FIG. 2, while in the region of the lower edge 4 of the window cutout, the window frame is just a window seal, as described in further detail with respect to FIG. 3.

Figure 2:
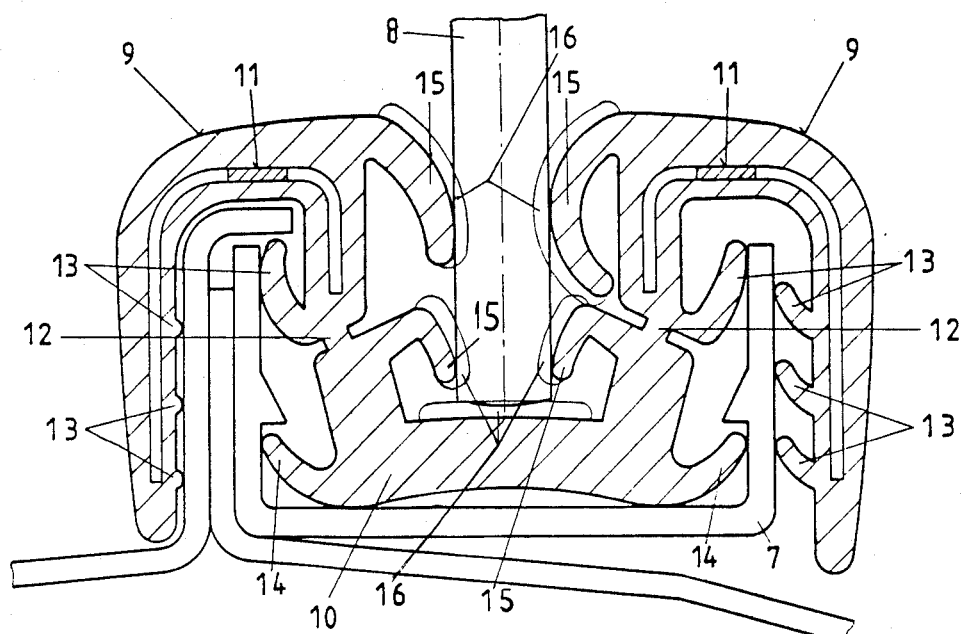
FIG. 2 is a section through the window-guide region of the window frame, approximately along the line II—II of FIG. 1.

The cross-section of FIG. 2 shows that the window frame, which is developed here as a window-guide profile, has two sealing strips 9 developed with an approximately U-shaped cross-section. In mounted condition, the strips 9 receive the window 8, indicated in dot-dash line, between them. The strips can be placed on the body flange 7 surrounding and defining the window cutout. The sealing strips 9 are connected as one piece together by a connecting bridge 10 which rests against the edge of the window 8 and extends approximately perpendicular to the plane of the window. Each of the sealing strips 9 is provided with an embedded reinforcement insert 11, which is further described below with reference to FIGS. 4 to 6. Like the sealing strips 9, each insert 11 has an approximately U-shaped cross-section which gives the U-shapes to the sealing strips. The connecting bridge 10 is also of U-shape as seen in cross-section. The ends of the arms of the bridge are connected by respective, relatively thin continuous connecting webs 12 to the ends of the arms of the sealing strips closest to the window 8.

Each sealing strip 9 forms a clamp jaw, and each can be placed over a body flange 7. Each strip has interior holding lips 13 inside its U-legs which rest on the sides of the body flange 7. A comparison of the left and the right sides of the drawing shows that the holding lips 13 may be of different development in the same or in different embodiments The connecting bridge 10 has holding lips 14 developed on its outside that engage the body flange 7 in order to improve the reliability of the holding of the window frame.

The sealing strips 9 and the connecting bridge 10 are provided with sealing lips 15 on their sides adjacent to the window 8. These lips are made particularly slidable on their window contacting surfaces by a flocking 15 on those surfaces, by coating those surfaces with a slide varnish, or the like. A corresponding flocking 15, or the like, is also provided on the connecting arm of the bridge 10, which comes to rest on the edge of the window.

Figure 3:
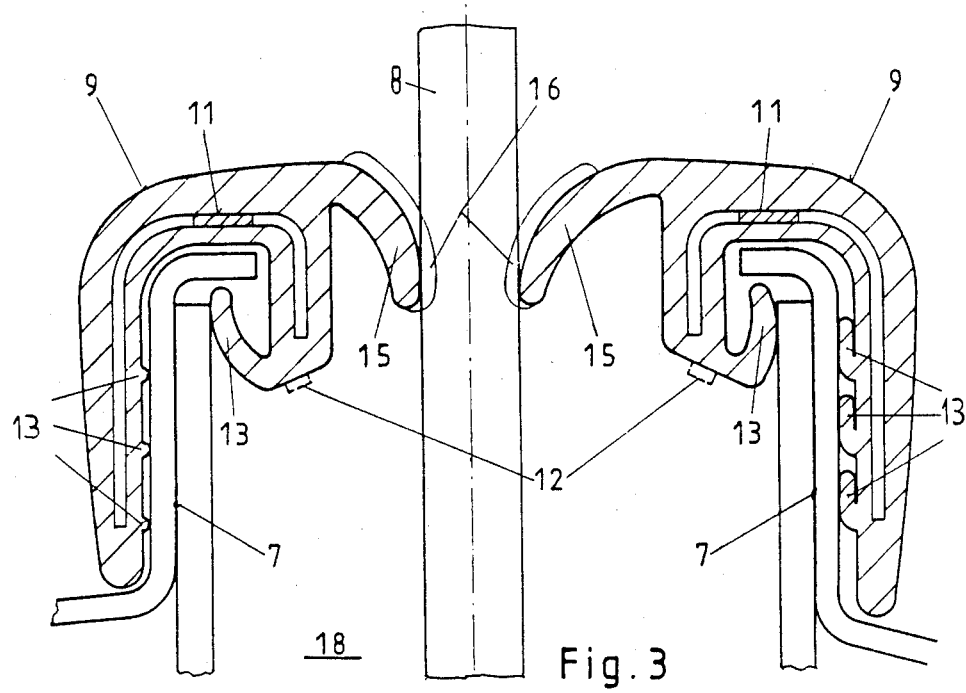
FIG. 3 is a section through the bottom edge region of the window frame, approximately along the line III-—III of FIG. 1.

In the regions of the upper edge 3 and of the side edges 5 of the window cutout 2, the window frame has the cross-sectional shape shown in FIG. 2. It has the different cross-sectional shape shown in FIG. 3 in the region of the lower edge 4 of the window cutout 2. The cross-section shape in FIG. 3 differs from the one shown in FIG. 2 to permit movement of the window, i.e. lowering of the window past the edge 4. In FIG. 3, the connecting bridge 10 has been separated from the sealing strips 9 along the connecting web 12. However, only separation in separate regions rather than a complete separation of the connecting bridge 10 is provided in that the connecting bridge 10 is cut through approximately in the middle region of the lower edge 4 of the window cutout 2 and is then pulled off, cut off, or torn off from the sealing strips along the connecting web 12, up to the region of the transition to the side edges 5 of the window cutout. This produces two connecting bridge end regions which emerge out of the window mounting frame and are inserted into guide channels 17 that are extensions of the side edges 5 of the window cutout 2 and that form the additional windowpane guides within the window shaft 18. The course of the mounting for this is indicated in FIG. 1.

The butt vulcanization place 6 is made relatively long and is in particular free of reinforcement inserts, so that tolerance equalization can be effected in the region of the place of vulcanization.

Figure 4:
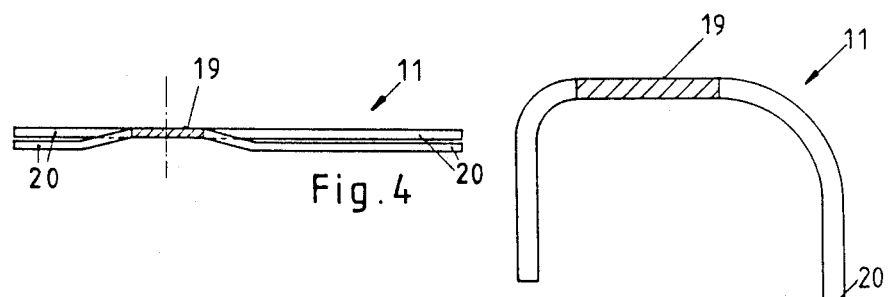
FIG. 4 is a cross-section view of a reinforcing insert for the window frame before flattening and profiling.
Figure 6:
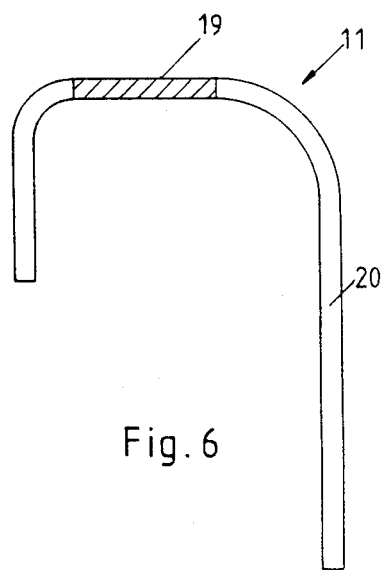
FIG. 6 is a cross-section view of the insert after profiling.
Figure 5:
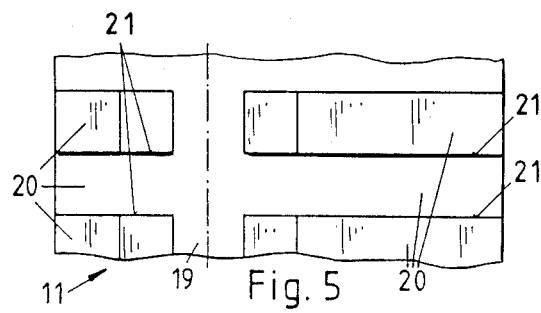
FIG. 5 is a plan view of the reinforcing insert.

The reinforcement insert 11 shown in FIGS. 4 to 6 is a stamp-cut metal strip or band having the special feature that it has a continuous smooth surface. The metal strip has a continuous web 19 that extends in the longitudinal direction of the insert strip. On both sides of the web there are defined free cut rungs 20 directed perpendicular to the web 19, practically without spacing between adjacent rungs. The unspaced arrangement of the rungs alongside of each other results from their being merely separated from each other by a stamping cut and not by a punch opening. Upon the manufacture of the reinforcement insert, a metal strip is accordingly provided in a continuous process with stamping cuts 21. This provides a continuous web 19 with rungs 20 defined on both sides of it. The metal tape subsequently is rolled in order to smooth out the deformations which were caused by the stamping cuts. It is then formed by rolling into a U-shaped cross-section. In the embodiment shown in the drawing, the web 19 is located in the base arm of the reinforcement insert.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A window frame for surrounding a window cutout in an automotive vehicle, the frame being for one of the movable windows of the vehicle; the window cutout having a first edge toward and away from which the window moves as it is opened and closed, and two side edges along which the window moves and a second edge over which and through which the window moves;

the window frame comprising:

a first and a second sealing strip positioned for receiving the movable window between them, a body flange of the vehicle projecting in from window cutout for defining a respective support for each of the first and second sealing strips; each sealing strip having an approximately U-shaped cross-section, including one leg of the U closer to the window and the other leg of the U further from the window and the U having legs which are positioned for receiving between them and for mounting the respective sealing strip on the body flange; window engaging means on the leg of each sealing strip closer to the window for engaging the window when it is between the sealing strips;

a connecting bridge extending across the plane of the window, behind the edge of the window supported between the sealing strips at the first and the side edges for joining together the one leg of each of the sealing strips nearer to the window; the bridge not being present and the legs of the sealing strips not being joined at the second edge of the window cutout past which the window moves;

a respective reinforcement insert of generally higher tensile and compressive strength but flexurally elastic and also approximately U-shaped cross-section being disposed within each of the sealing strips and defining the respective U-shape of the sealing strips.

2. The window frame of claim 1, wherein each of the reinforcement inserts is developed approximately U-shaped in cross-section and has a smooth exterior of its U-shape.

3. The window frame of claim 1, wherein the window frame is comprised of rubber, or the like material, and the reinforcement insert is embedded in the rubber, or the like, of the window frame and is of a stiffer material for stiffening each of the sealing strips.

4. The window frame of claim 1, further comprising a coating of a coupling agent on both sides of each reinforcing insert for coupling the insert to the covering thereover.

5. The window frame of claim 1, wherein the window frame is comprised of rubber, or the like covering material, and the reinforcing insert is embedded in the covering material.

6. The window frame of claim 1, wherein the connecting bridge extends along the side edges of the cutout toward the second edge of the cutout and then include portions that extend past and away from the second edge of the cutout without extending along the second edge of the cutout so that both portions of the bridge may define window guides for the window past the second edge of the window cutout.

7. The window frame of claim 6, wherein the extended portions of the connecting bridge are of approximately equal length and approximately half the length of the second edge of the cutout.

8. The window frame of claim 1, wherein the window engaging means on the sealing strip includes sealing lips which extend toward and rest against the side of the window moving past the sealing strips.

9. The window frame of claim 8, wherein the window engaging means on the connecting bridge includes sealing lips thereon which rest against the sides of the window moving therepast.

10. The window frame of claim 1, wherein the connecting bridge has an approximately U-shaped cross-section including legs of the U which extend to the respective legs of the sealing strips which are closer to the window frame; means at the end of the legs of the bridge for connecting the bridge legs to the respective legs of the sealing strip.

11. The window frame of claim 10, wherein the means for connecting the legs of the bridge to the respective legs of the sealing strip comprise a relatively thin, continuous connecting web extending around the window frame and being severable for separating the bridge from the legs of the sealing strip along the second edge of the window frame.

12. The window frame of claim 1, wherein the window frame is comprised of an elongate frame having opposite ends, the opposite ends are brought together to complete the window frame around the window cutout, the ends are butt vulcanized together at a butt vulcanization place, and the reinforcing insert extending around the window frame up to but not into the butt vulcanization place.

13. The window frame of claim 12, wherein the vulcanization place has a length around the window frame of up to 30 millimeters.

14. The window frame of claim 12, wherein the vulcanization place is disposed around the window frame in one of the side edges thereof toward the second edge thereof to be generally in a lower corner region of the window frame near the second edge.

15. The window frame of claim 12, wherein the vulcanization place is defined between the ends of the window frame at both of the first and the second sealing strips and at the connecting bridge.

16. The window frame of claim 1, wherein each reinforcement insert comprises a metal strip of generally U-shaped cross-sectional profile.

17. The window frame of claim 16, wherein each metal strip reinforcement insert has at least one continuous web extending along the length of the insert around the window frame and comprises a plurality of rungs defined in the metal strip and extending in the direction away from the continuous web.

18. The window frame of claim 17, wherein the insert strip is formed such that the rungs are alongside each other and are without spacing between adjacent rungs.

19. The window frame of claim 18, wherein the web of the U-shaped insert is defined in the base of the U-shaped metal strip, and the rungs are arranged on either side of the web to extend away from the web at both sides and the rungs are arranged alongside each other without spacing between adjacent rungs.

20. The window frame of claim 19, wherein each reinforcing insert comprises a stamp-cut, smooth rolled, U-shaped profiled metal strip.

* * * * *